(12) United States Patent
Nicholson

(10) Patent No.: US 11,854,371 B1
(45) Date of Patent: Dec. 26, 2023

(54) EMERGENCY ALARM ACTIVATION RADIO DEVICE

(71) Applicant: Paul Nicholson, Bayside, CA (US)

(72) Inventor: Paul Nicholson, Bayside, CA (US)

( * ) Notice: Subject to any disclaimer, the term of this patent is extended or adjusted under 35 U.S.C. 154(b) by 0 days.

(21) Appl. No.: 17/949,035

(22) Filed: Sep. 20, 2022

(51) Int. Cl.
*G08B 29/18* (2006.01)
*G08B 21/02* (2006.01)
*H04B 1/3827* (2015.01)

(52) U.S. Cl.
CPC ............. *G08B 29/18* (2013.01); *G08B 21/02* (2013.01); *H04B 1/3833* (2013.01)

(58) Field of Classification Search
CPC ....... G08B 29/18; G08B 21/02; H04B 1/3833
See application file for complete search history.

(56) References Cited

U.S. PATENT DOCUMENTS

| | | | |
|---|---|---|---|
| D255,106 S | 5/1980 | Bodenrader | |
| 5,835,573 A | 11/1998 | Dee | |
| 6,236,303 B1 | 5/2001 | Wagner | |
| 6,359,564 B1 | 3/2002 | Thacker | |
| 7,443,971 B2 | 10/2008 | Bear | |
| 8,035,519 B2 | 10/2011 | Davis | |
| 9,226,321 B1* | 12/2015 | Eddings | H04M 1/72424 |
| 9,532,558 B2* | 1/2017 | Hamilton, II | A01K 87/007 |
| 10,692,358 B2* | 6/2020 | King | G08B 15/004 |
| 2006/0264205 A1 | 11/2006 | Gibbs | |
| 2007/0229298 A1* | 10/2007 | Frederick | E21F 11/00 340/13.25 |
| 2011/0099682 A1* | 5/2011 | Earley | A41D 13/0012 2/247 |
| 2015/0310711 A1* | 10/2015 | Fawcett | A47J 31/20 340/568.3 |

FOREIGN PATENT DOCUMENTS

CA 2311616 12/2000

* cited by examiner

*Primary Examiner* — John A Tweel, Jr.

(57) ABSTRACT

An emergency alarm activation radio device for preventing false alarms includes a radio being a handheld radio transceiver in wireless communication with a plurality of radio devices. In addition, the radio has a microprocessor containing functions of the radio. An emergency alarm is integrated within the radio for signifying an emergency when actuated. The emergency alarm includes a trigger and a cord protruding out from the trigger and enwrapping a spool for unwinding the cord thus reducing an unintentional engagement with the trigger. The spool is rotatable and a knob rotates the spool when turned by the hand of the user. A handle is attached to the cord of the trigger and is pulled to actuate the trigger.

18 Claims, 7 Drawing Sheets

EMERGENCY ALARM ACTIVATION RADIO DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to emergency alarm devices and more particularly pertains to a new emergency alarm device for notifying of immediate danger for people to stop and observe and move away from the danger with a feature to prevent false alarms.

(2) Description of Related Art Including Information Disclosed Under 37 CFR 1.97 and 1.98

The prior art relates to emergency alarm devices. The prior art includes a variety of emergency alarm devices being integrated within a handheld radio transceiver. Furthermore, the prior art includes a variety of emergency alarm devices having a pull trigger mechanism. Known prior art lacks an emergency alarm device being integrated within a handheld radio transceiver and having a pull trigger mechanism with a spool for reducing false alarms from accidental engagement of the pull trigger mechanism.

BRIEF SUMMARY OF THE INVENTION

An embodiment of the disclosure meets the needs presented above by generally comprising a radio. The radio is a handheld radio transceiver configured for being in wireless communication with a plurality of radio devices. In addition, the radio has a microprocessor configured for containing functions of the radio. An emergency alarm is integrated within the radio and is configured for signifying an emergency when actuated. The emergency alarm further comprises a trigger in electric communication with the microprocessor of the radio. The trigger has a cord protruding out from the trigger and enwrapping a spool being configured for unwinding the cord wherein reducing an unintentional engagement with the trigger. The spool is rotatable and a knob is configured for rotating the spool when turned by the hand of the user. A handle is coupled to the cord of the trigger and is configured for pulling the cord wherein actuating the trigger.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
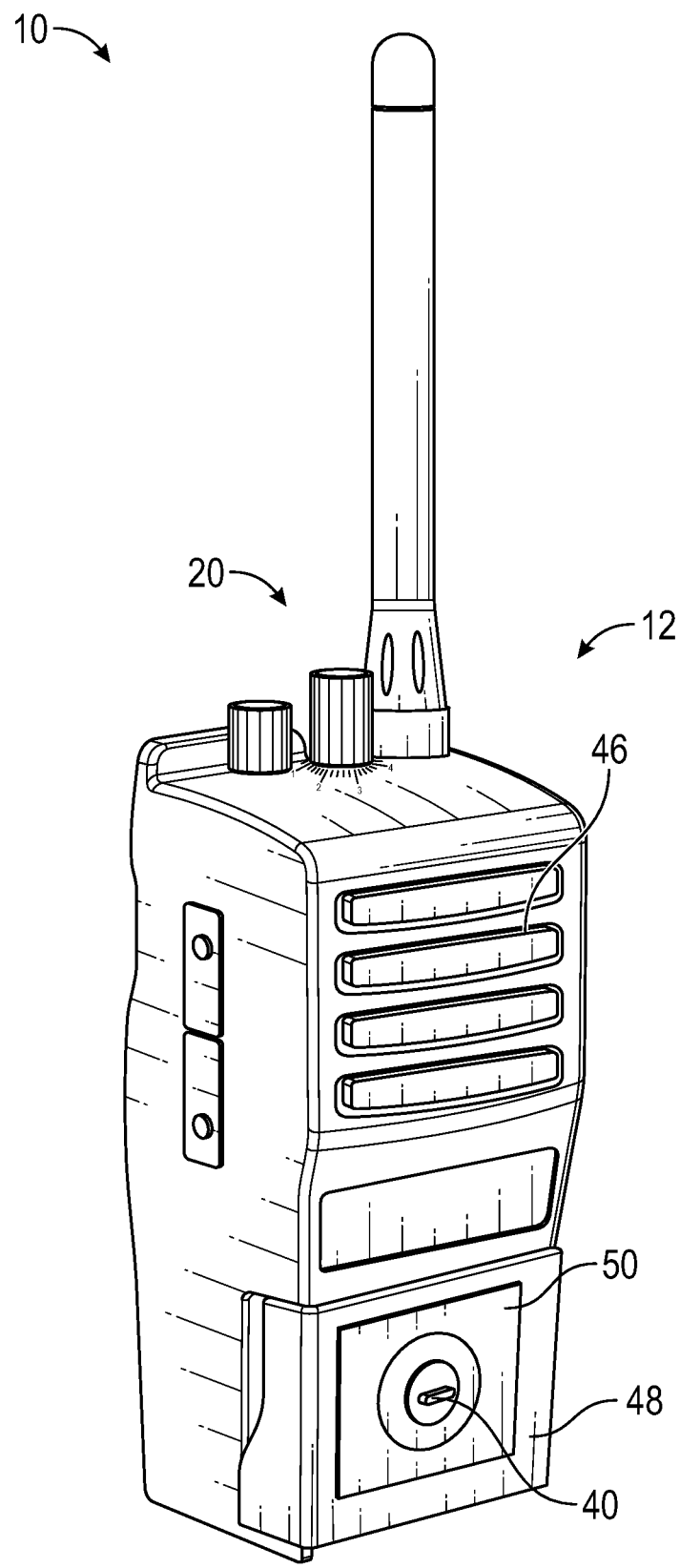
FIG. 1 is a top isometric view of an emergency alarm activation radio device according to an embodiment of the disclosure.
Figure 2:
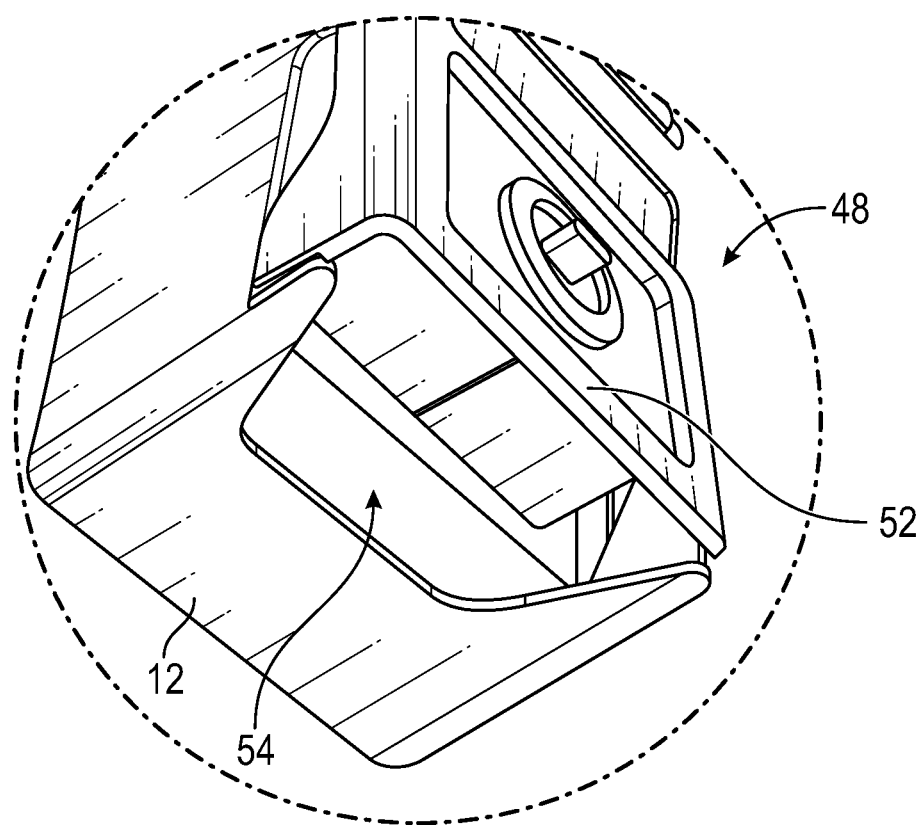
FIG. 2 is a bottom isometric view of an embodiment of the disclosure.
Figure 3:
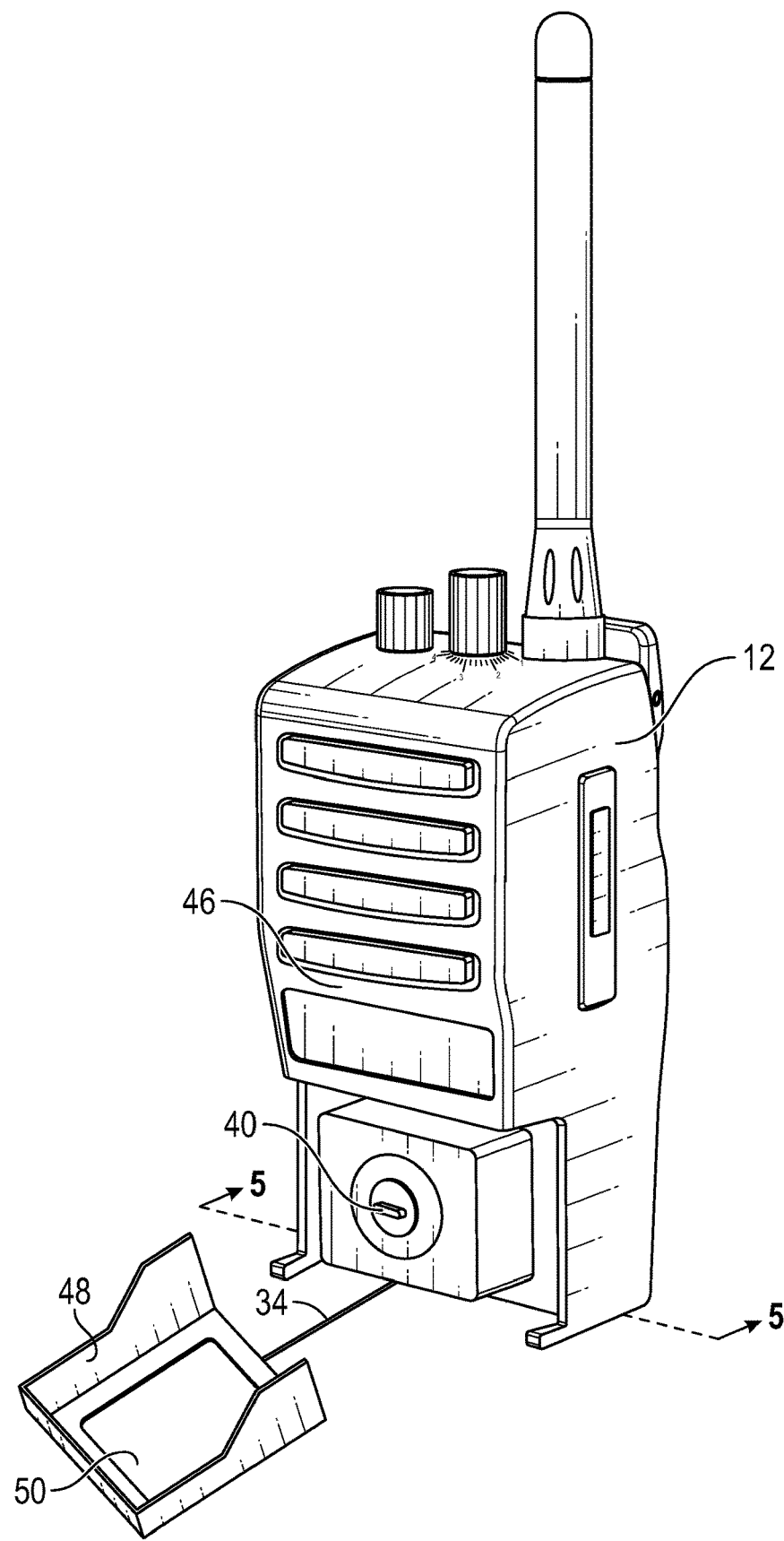
FIG. 3 is a top isometric view of an embodiment of the disclosure.
Figure 4:
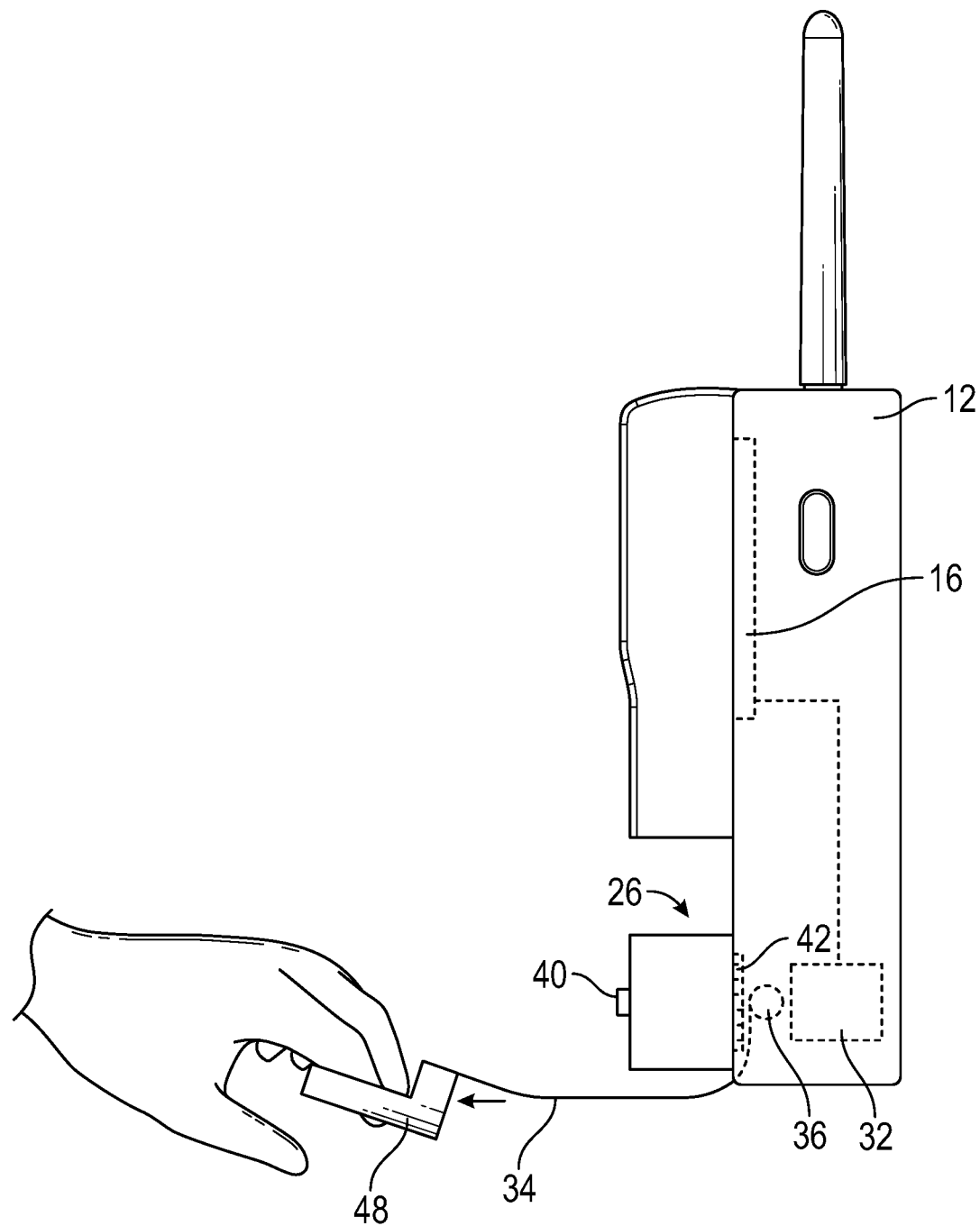
FIG. 4 is an in-use view of an embodiment of the disclosure.
Figure 5:
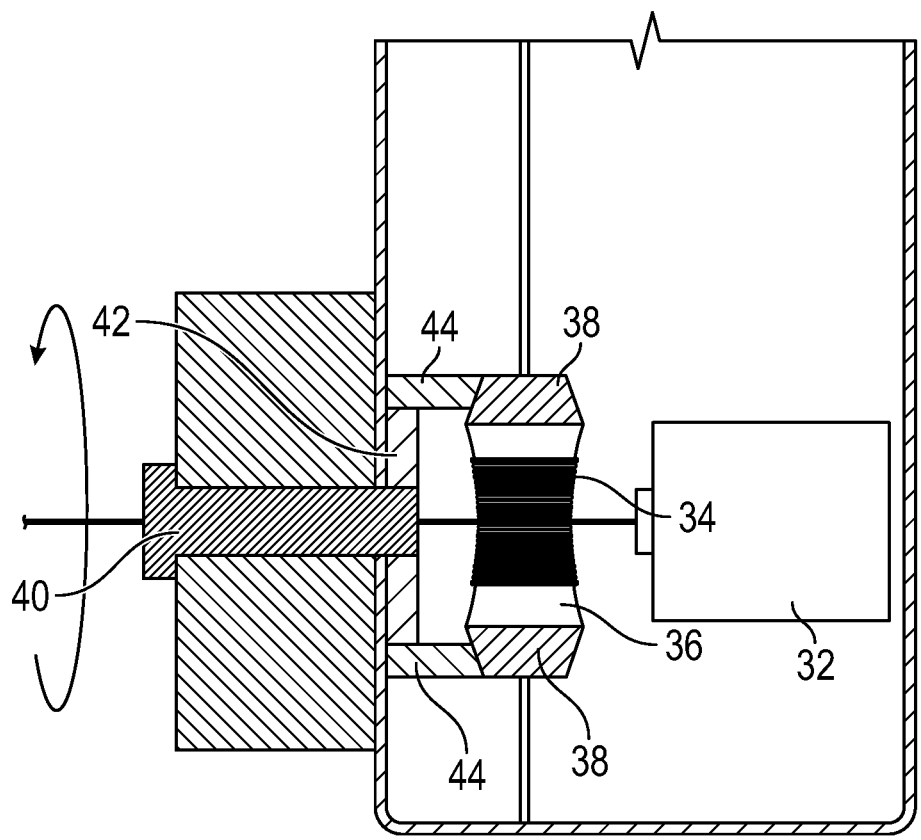
FIG. 5 is a cross-sectional view of an embodiment of the disclosure taken along line 5-5 of FIG. 3.
Figure 6:
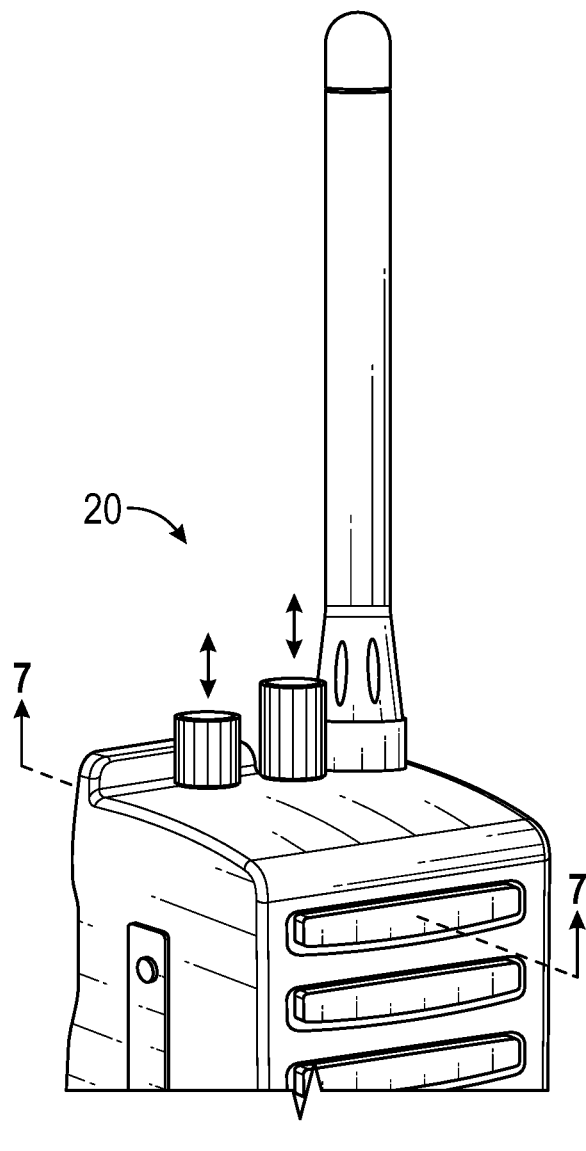
FIG. 6 is a top isometric view of an embodiment of the disclosure.
Figure 7:
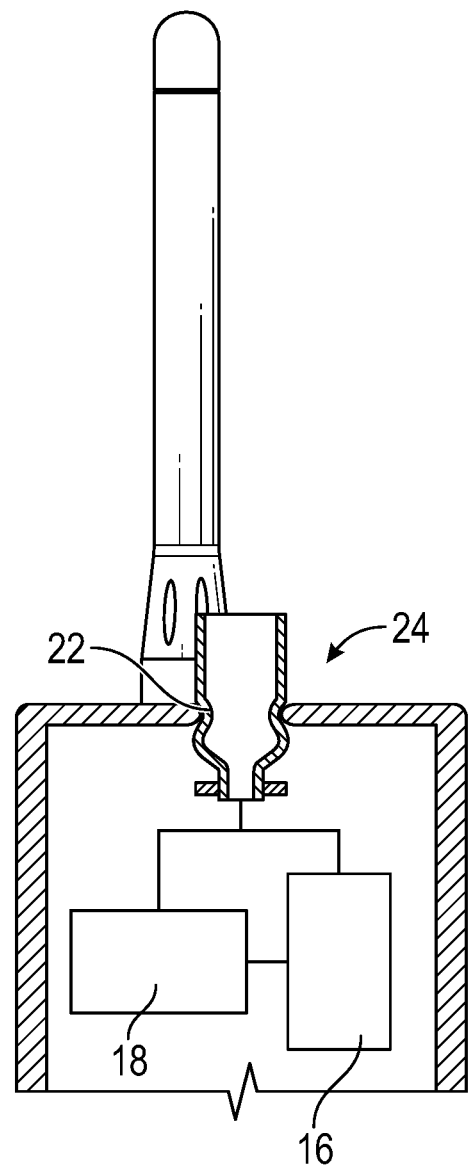
FIG. 7 is a cross-sectional view of an embodiment of the disclosure taken from FIG. 6 of Line 7-7.
Figure 8:
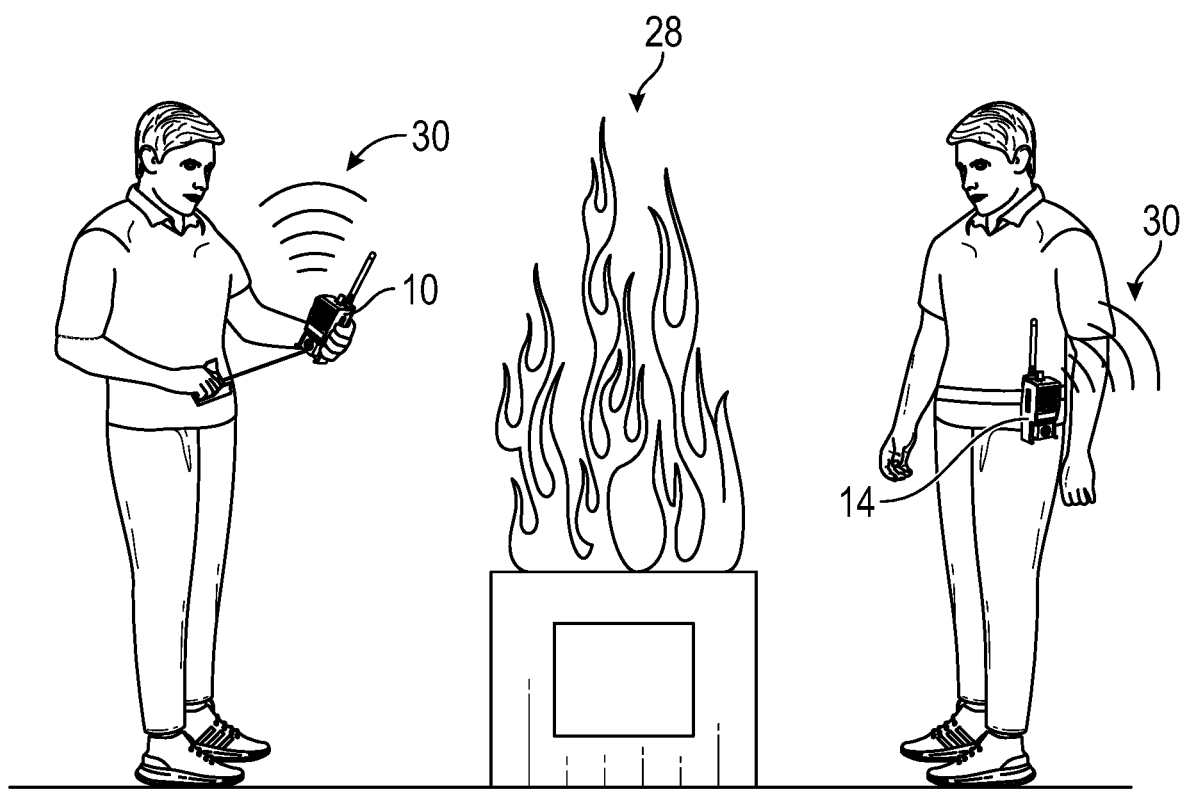
FIG. 8 is an in-use view of an embodiment of the disclosure.

With reference now to the drawings, and in particular to FIGS. 1 through 7 thereof, a new emergency alarm device embodying the principles and concepts of an embodiment of the disclosure and generally designated by the reference numeral 10 will be described.

As best illustrated in FIGS. 1 through 7, the emergency alarm activation radio device 10 generally comprises a radio 12. The radio 12 is a handheld radio transceiver configured for being in wireless communication with a plurality of radio devices 14. The radio 12 is typically known as the Walkie-Talkie. The radio 12 is an encasement housing a plurality of elements including a microprocessor 16 being in electric communication with a transmitter 18 configured for being in wireless communication with the plurality of radio devices 14 by radio frequency transmission. In addition, the radio 12 has a pair of dials 20 in electric communication with the microprocessor 16. Each of the dials 20 is configured for directing communication by the transmitter 18 of the radio 12 with each of the radio devices 14 by selecting a channel for the radio 12 to be on air with. Each of the dials 20 has an indent 22 being complementary to a pair of holes 24 of the radio 12. The indent 22 of each of the dials 20 is configured for retaining in a fixed position when coplanar with each of the holes 24 of the radio 12. The user can remove each of the dials 20 from being positioned coplanar with each of the holes 24 by pulling up on each of the dials 20 wherein being able to rotate each of the dials 20 for changing the channel for the radio 12. The indent 22 of each of the dials 20 retains the dial in a fixed position wherein preventing the radio 12 from changing channels unintentionally.

An emergency alarm 26 is integrated within the radio 12. The emergency alarm 26 is configured for signifying an emergency 28 within a setting when actuated, such as an emergency 28 within a labor work setting. The emergency alarm 26 will emit a high pitched noise 30 from the radio 12 which will be able to be heard over loud noises within the setting. Furthermore, the emergency alarm 26 will emit the high pitched noise 30 over the plurality of radio devices 14 on the same channel as the radio 12 to alert others of the emergency 28. The emergency alarm 26 further comprises a trigger 32 in electric communication with the microprocessor 16 of the radio 12. The trigger 32 is a pull switch configured for actuating the emergency alarm 26 when engaged by a cord 34 protruding out from the trigger 32. A spool 36 enwraps the cord 34 of the trigger 32 and is configured for unwinding the cord 34 wherein reducing an unintentional engagement with the trigger 32. When the trigger 32 is pulled, the spool 36 will cause a delay from unwinding prior to actuating the emergency alarm 26 thus reducing an unintentional emergency alert.

The spool 36 is positioned proximate to the trigger 32 and is rotatable with a pair of ends 38 being threaded. Furthermore, a knob 40 is configured for rotating the spool 36. The knob 40 has a disc 42 being threaded. A pair of gears 44 is in mechanical communication with the disc 42 and the pair of ends 38 of the spool 36 wherein the knob 40 is configured for rotating the spool 36 by the pair of gears 44. The knob 40 is positioned on a front surface 46 of the radio 12 and is configured for turning by the hand of the user. In addition, the knob 40 is configured for being a yellow color which provides a visual indication to the user for where to engage with the knob 40.

Moreover, a handle 48 is coupled to the cord 34 of the trigger 32. The handle 48 is positioned on the front surface 46 of the radio 12 and includes an opening 50 where the knob 40 can be nested within. The opening 50 of the handle 48 is configured for being able to fit around a pair of fingers wearing a padded glove. The handle 48 is configured for being a red color which is complementary to an alarm thus indicating the user where to activate the emergency alarm 26. The handle 48 can be removed from the front surface 46 of the radio 12 by pulling on a bottom 52 of the handle 48 within a gap 54 between the handle 48 and the radio 12. The gap 54 defines a space for detaching the handle 48 from the radio 12 prior to pulling the cord 34 wherein actuating the trigger 32. The handle 48 is retained in place to the radio 12 by winding the cord 34 upon the spool 36 and nesting the opening 50 of the handle 48 around the knob 40 wherein retaining the handle 48 in a fixed position by contact friction.

In use, the user will detach the handle 48 from the radio 12 by pulling on the bottom 52 of the handle 48 within the gap 54 of the radio 12. The user will then pull out the handle 48 from the radio 12 wherein unraveling the cord 34 from the spool 36 until activating the trigger 32 and engaging the emergency alarm 26. The emergency alarm 26 will emit a high pitched noise 30 from the radio 12 and from the plurality of radio devices 14 on the same channel as the radio 12 to signify the emergency 28 within the setting. To disengage the emergency alarm 26, the user will turn the knob 40 to begin winding the cord 34 upon the spool 36 wherein releasing the cord 34 from the trigger 32.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An emergency alarm radio device configured for emitting an alarm when engaged with a trigger, the emergency alarm radio device comprising:
   a radio, said radio being a handheld radio transceiver, said radio being configured for being in wireless communication with a plurality of radio devices, said radio having a microprocessor, said microprocessor being configured for containing functions of said radio;
   an emergency alarm being integrated within said radio, said emergency alarm being configured for signifying an emergency when actuated, said emergency alarm further comprising:
      a trigger being in electric communication with said microprocessor of said radio, said trigger having a cord, said cord protruding out from said trigger;
      a spool enwrapping said cord of said trigger, said spool being configured for unwinding said cord wherein reducing an unintentional engagement with said trigger, said spool being rotatable;
      a knob being configured for rotating said spool, said knob being configured for being turned by the hand of the user; and
      a handle being coupled to said cord of said trigger, said handle being configured for pulling said cord wherein actuating said trigger.

2. The emergency alarm radio device of claim 1, further comprising said radio being an encasement housing a plurality of elements.

3. The emergency alarm radio device of claim 2, further comprising said microprocessor being in electric communication with a transmitter, said transmitter being configured for being in wireless communication with said plurality of radio devices by radio frequency transmission.

4. The emergency alarm radio device of claim 3, further comprising said radio having a pair of dials, said pair of dials being in electric communication with said transmitter, each of said dials being configured for directing communication of said radio with each of said radio devices.

5. The emergency alarm radio device of claim 4, further comprising each of said dials having an indent, said indent of each of said dials being complementary to a pair of holes of said radio.

6. The emergency alarm radio device of claim 5, further comprising said indent of each of said dials being configured for retaining in a fixed position when coplanar with each of said holes of said radio.

7. The emergency alarm radio device of claim 1, further comprising said trigger being a pull switch configured for actuating said emergency alarm when engaged.

8. The emergency alarm radio device of claim 1, further comprising said spool being positioned proximate to said trigger.

9. The emergency alarm radio device of claim 8, further comprising said spool having a pair of ends, said pair of ends of said spool being threaded.

10. The emergency alarm radio device of claim 9, further comprising said knob having a disc, said disc being threaded.

11. The emergency alarm radio device of claim 10, further comprising a pair of gears being in mechanical communication with said disc and said pair of ends of said spool.

12. The emergency alarm radio device of claim 11, further comprising said knob being configured for rotating said spool by said pair of gears.

13. The emergency alarm radio device of claim 1, further comprising said knob being positioned on a front surface of said radio.

14. The emergency alarm radio device of claim 1, further comprising said knob configured for being a yellow color.

15. The emergency alarm radio device of claim 13, further comprising said handle being positioned on said front surface of said radio.

16. The emergency alarm radio device of claim 15, further comprising said handle having an opening, said knob being nested within said opening of said handle.

17. The emergency alarm radio device of claim 14, further comprising said handle configured for being a red color.

18. An emergency alarm radio device configured for emitting an alarm when engaged with a trigger, the emergency alarm radio device comprising:
- a radio, said radio being a handheld radio transceiver, said radio being configured for being in wireless communication with a plurality of radio devices, said radio being an encasement housing a plurality of elements, said radio having a microprocessor, said microprocessor being configured for containing functions of said radio, said microprocessor being in electric communication with a transmitter, said transmitter being configured for being in wireless communication with said plurality of radio devices by radio frequency transmission, said radio having a pair of dials, said pair of dials being in electric communication with said transmitter, each of said dials being configured for directing communication of said radio with each of said radio devices, each of said dials having an indent, said indent of each of said dials being complementary to a pair of holes of said radio, said indent of each of said dials being configured for retaining in a fixed position when coplanar with each of said holes of said radio;
- an emergency alarm being integrated within said radio, said emergency alarm being configured for signifying an emergency when actuated, said emergency alarm further comprising:
  - a trigger being in electric communication with said microprocessor of said radio, said trigger being a pull switch configured for actuating said emergency alarm when engaged, said trigger having a cord, said cord protruding out from said trigger;
  - a spool enwrapping said cord of said trigger, said spool being configured for unwinding said cord wherein reducing an unintentional engagement with said trigger, said spool being positioned proximate to said trigger, said spool being rotatable, said spool having a pair of ends, said pair of ends of said spool being threaded;
  - a knob being configured for rotating said spool, said knob having a disc, said disc being threaded, a pair of gears being in mechanical communication with said disc and said pair of ends of said spool, said knob being configured for rotating said spool by said pair of gears, said knob being positioned on a front surface of said radio, said knob being configured for being turned by the hand of the user, said knob configured for being a yellow color; and
  - a handle being coupled to said cord of said trigger, said handle being positioned on said front surface of said radio, said handle having an opening, said knob being nested within said opening of said handle, said handle configured for being a red color, said handle being configured for pulling said cord wherein actuating said trigger.

* * * * *